Patented June 2, 1942

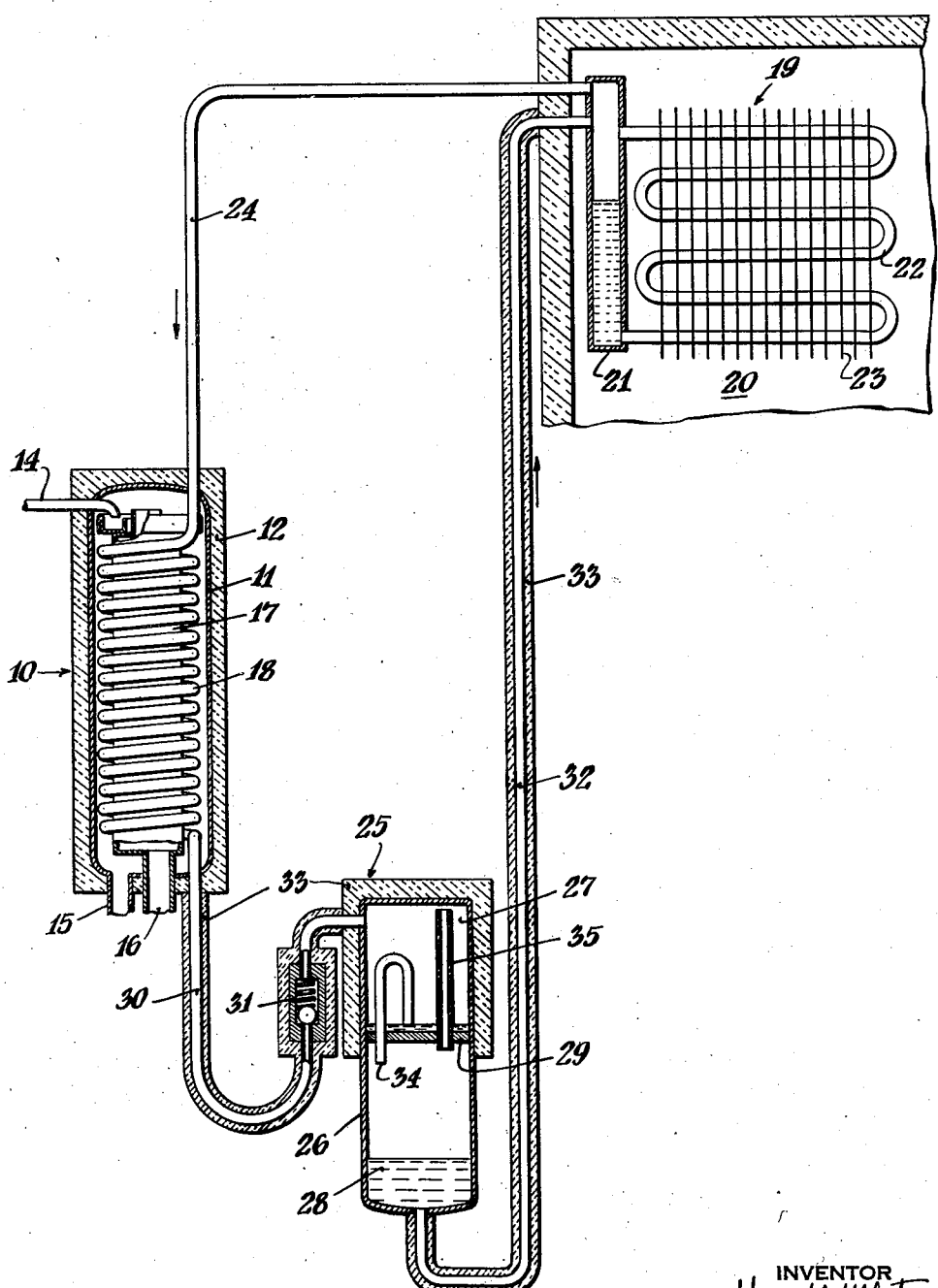

2,285,131

UNITED STATES PATENT OFFICE 2,285,131

REFRIGERATION

Hugo M. Ullstrand, Evansville, Ind., assignor to Servel, Inc., New York, N. Y., a corporation of Delaware Application March 14, 1938, Serial No. 195,736

12 Claims. (Cl. 62—125)

This invention relates to refrigeration, and it is an object of the invention to provide an improvement for transferring heat whereby cooling is effected at a higher level than a source of refrigeration.

The above and other objects and advantages of the invention will become apparent from the following description taken in conjunction with the accompanying drawing forming a part of this specification, and of which the single figure more or less diagrammatically illustrates an embodiment of the invention.

In the drawing the invention is shown in connection with a cooling element or evaporator 10 of a refrigeration system of a uniform pressure absorption type, and like that described in application Serial No. 107,852 of A. R. Thomas, filed October 27, 1936, now Patent No. 2,207,838 granted July 16, 1940. The cooling element 10 includes a casing 11 which may be embedded in insulation 12. Liquid refrigerant, such as ammonia, enters the upper part of casing 11 through a conduit 14. The liquid evaporates and diffuses in casing 11 into an inert gas, such as hydrogen, to produce a refrigerating effect.

The resulting gas mixture of refrigerant and inert gas flows from casing 11 through a conduit 15 to an absorber wherein refrigerant gas is absorbed into a liquid absorbent, such as water. Inert gas weak in refrigerant is returned to cooling element 10 through a conduit 16 and a cylinder 17 which is disposed within casing 11 and open at its upper end.

Absorption liquid which is enriched in the absorber is conducted to a generator where it is heated and refrigerant is expelled out of solution. Refrigerant vapor expelled out of solution is condensed in a condenser and then returned to cooling element 10 through conduit 14 to complete the refrigerating cycle. The weakened absorption liquid from which refrigerant has been expelled is conducted from the generator to the absorber to again absorb refrigerant vapor.

In order to simplify the drawing, the absorber, generator, and condenser of the refrigeration system have not been shown, the illustration of these parts not being necessary for an understanding of this invention. The disclosure in the aforementioned Thomas application may be considered as being incorporated in this application, and, if desired, reference may be made thereto for a more detailed description of the refrigeration system.

The refrigerating effect produced by cooling element 10 is utilized to cool and liquefy a volatile fluid flowing through a coil 18 which is arranged about cylinder 17 and over which liquid refrigerant flows. The coil 18 constitutes the condenser of a heat transfer system whereby cooling may be effected at a place above the cooling element 10. The heat transfer system includes an evaporator 19 which is of the flooded type and located at a higher level than condenser 18. The evaporator 19 is disposed in a heat insulated space 20 and includes a receiver 21 having a looped coil 22 connected thereto. A plurality of heat transfer fins 23 are fixed to coil 22 to increase the heat transfer surface of the evaporator.

The condenser 18 and evaporator 19 form part of a closed fluid circuit which is partly filled with a suitable volatile liquid, such as methyl chloride, for example, that evaporates in evaporator 19 and takes up heat thereby producing cold. The vapor flows from evaporator 19 through a conduit 24 into condenser 18 in which the vapor is cooled and condensed by cooling element 10.

In accordance with the invention, a transfer vessel 25 is provided for raising liquid from condenser 18 to evaporator 19 so that cooling may be effected in space 20. The transfer vessel 25 comprises a casing 26 divided into two chambers 27 and 28 by a partition 29. The lower end of condenser 18 is connected by a U-shaped conduit 30 to the upper part of chamber 27.

A check valve 31 may be connected in conduit 30. The lower part of chamber 28 is connected by a conduit 32 to an upper part of receiver 21 of evaporator 19. To prevent evaporation of liquid in conduits 30 and 32 and upper chamber 27, these parts are embedded in insulation 33.

Within chamber 27 is disposed an inverted U-shaped syphon tube 34 having one arm thereof terminating in the lower part of the chamber above partition 29, and the other arm thereof extending through an opening in the partition and terminating in the upper part of chamber 28. A vent tube 35 provides communication between the upper parts of chambers 27 and 28.

The operation of the heat transfer system just described is substantially as follows: The vapor formed in evaporator 19 flows through conduit 24 into condenser 18 in which the vapor is condensed, as explained above. The condensed fluid flows from condenser 18 through conduit 30 into upper chamber 27 of transfer vessel 25. The check valve 31 permits flow of liquid into chamber 27 due to the liquid head in the left-hand leg of conduit 30. During the periods when liquid is flowing into upper chamber 27, the lower chamber 28 and conduit 32 are empty and these parts, together with tube 35, provide a vent for upper chamber 27.

When the liquid level in chamber 27 rises to the upper end of syphon tube 34, the liquid in the upper chamber is syphoned through tube 34 into lower chamber 28. The liquid flowing into lower chamber 28 forms a liquid column in this chamber and in the lower part of conduit 32. The flow of liquid from upper chamber 27 into lower chamber 28 stops when the liquid level falls below the lower end of tube 34 in upper chamber 27.

The liquid segregated in lower chamber 28 evaporates due to heat transfer from surrounding warmer air which may be at room temperature. The vapor formed in this manner may flow into upper chamber 27 through vent tube 35. The vapor pressure above the liquid in lower chamber 28 and also in upper chamber 27 continues to increase, due to evaporation of liquid, and acts to close check valve 31. When the vapor pressure is sufficiently great, liquid is forced upwardly in conduit 32 and into receiver 21. All of the segregated liquid is raised into receiver 21 whereby the trapped vapor is also released into receiver 21. When trapped vapor is released into receiver 21, lower chamber 28 and conduit 32 do not contain any liquid.

With transfer vessel 25 and evaporator 19 again in open communication with each other, the pressure in the system becomes equalized, and, with the liquid head in the left-hand leg of conduit 30 sufficiently high, check valve 31 is opened and liquid flows into upper chamber 27. When the liquid level in upper chamber 27 rises to the upper end of syphon tube 34, liquid flows from upper chamber 27 into lower chamber 28 and a pressure difference is again produced or created between transfer vessel 25 and evaporator 19, due to the temperature difference of these parts.

If the height of the liquid trap formed by U-shaped conduit 30 is sufficiently long, check valve 31 may be omitted. In such case liquid in the right-hand leg of U-shaped conduit 30 is forced downward when the vapor pressure builds up in chambers 27 and 28 to force liquid upward from chamber 28 to evaporator 19. The height of the liquid trap should be greater than the height through which liquid is raised in conduit 32, so that the liquid column in the left-hand leg of U-shaped conduit 30 will always balance the vapor pressure in chambers 27 and 28.

With the liquid trap sufficiently long, trapped vapor will always be released to evaporator 19 and not pass through U-shaped conduit 30 into condenser 18. When lower chamber 28 and conduit 32 are empty and the pressures in transfer vessel 25 and evaporator 19 are equalized, liquid in conduit 30 will flow from condenser 18 into upper chamber 27 of the transfer chamber.

While a single embodiment of the invention has been shown and described, such variations and modifications are contemplated which fall within the true spirit and scope of the invention, as pointed out in the following claims.

What is claimed is:

1. A method of heat transfer which includes vaporizing liquid fluid in a place of vaporization at an upper elevation, condensing vaporized fluid in a place of condensation at a lower elevation, flowing liquid condensate to a place of accumulation, removing from said place of accumulation a quantity of liquid when a predetermined amount thereof accumulates at the place of accumulation, and raising substantially all of the removed liquid between said elevations by trapping vapor above a liquid surface thereof to exert force thereon.

2. A method of heat transfer which includes vaporizing liquid fluid in a place of vaporization at an upper elevation, condensing vaporized fluid in a place of condensation at a lower elevation, accumulating the liquid condensed at said lower elevation, raising liquid condensate between said elevations by removing a quantity of said accumulated liquid at intermittent intervals of time, lifting substantially all of the removed liquid by trapping vapor above a liquid surface thereof to produce a lifting force, and alternately trapping vapor above the removed liquid and releasing the vapor after substantially all of the removed liquid has been raised.

3. A method as defined in claim 2 in which the trapped vapor is formed by transfer of heat to the removed liquid.

4. A method as defined in claim 2 in which the trapped vapor is formed by atmospheric heating of the removed liquid.

5. A method as defined in claim 2 in which the trapped vapor is released in the place of vaporization.

6. A heat transfer system comprising a closed fluid circuit partly filled with a volatile liquid and including a vaporization portion at an upper elevation and a condensation portion at a lower elevation, thermally insulated means to accumulate liquid condensed at said lower level, and means to raise liquid between said elevations and including structure to remove a quantity of said accumulated liquid at intermittent intervals of time and accumulate vapor above a liquid surface thereof to exert a lifting force to lift substantially all of the removed liquid, and said structure being constructed and arranged to permit release of accumulated vapor therefrom when substantially all of the removed liquid has been lifted.

7. A heat transfer system as defined in claim 6 and including a conduit to permit release of accumulated vapor to said vaporization portion.

8. A heat transfer system as defined in claim 6 in which accumulated vapor is formed by atmospheric heating of removed liquid.

9. A heat transfer system as defined in claim 6 having means to prevent flow of liquid to said structure when vapor has accumulated above a removed quantity of liquid and such liquid is being lifted.

10. A heat transfer system as defined in claim 6 having means to prevent flow of liquid to said structure when the vapor pressure of accumulated vapor therein is above a predetermined high value.

11. A method of heat transfer which includes vaporizing liquid fluid in a place of vaporization at an upper elevation, condensing vaporized fluid in a place of condensation at a lower elevation, accumulating the liquid condensed at said lower elevation, raising liquid condensate between said elevations by segregating a quantity of said accumulated liquid at intermittent intervals of time by siphonic action, lifting substantially all of the segregated liquid by trapping vapor above a liquid surface thereof to produce a force thereon and alternately trapping vapor above the segregated liquid and releasing the vapor after substantially all of the segregated liquid has been raised.

12. A heat transfer system comprising a closed fluid circuit containing a volatile fluid and including a vaporization portion at an upper elevation and a condensation portion at a lower elevation, thermally insulated means to accumulate liquid condensed at said lower elevation, and means to raise liquid between said elevations and including a siphon to segregate a quantity of said accumulated liquid at intermittent intervals of time, and structure to accumulate vapor above a liquid surface of the segregated liquid to exert a force to lift substantially all of the segregated liquid, said structure being constructed and arranged to permit release of accumulated vapor therefrom when substantially all of the segregated liquid has been lifted.

HUGO M. ULLSTRAND.